Jan. 10, 1950  G. WIKKENHAUSER  2,493,793
FILM PROJECTION WITH CONTINUOUSLY MOVING FILM
Filed Sept. 17, 1945  2 Sheets-Sheet 1

Gustav Wikkenhauser

Jan. 10, 1950 G. WIKKENHAUSER 2,493,793
FILM PROJECTION WITH CONTINUOUSLY MOVING FILM
Filed Sept. 17, 1945 2 Sheets-Sheet 2

Gustav Wikkenhauser

Patented Jan. 10, 1950

2,493,793

UNITED STATES PATENT OFFICE 2,493,793

FILM PROJECTION WITH CONTINUOUSLY MOVING FILM

Gustav Wikkenhauser, Wells, England, assignor, by mesne assignments, to Skiatron Corporation, New York, N. Y., a corporation of New York Application September 17, 1945, Serial No. 616,761
In Great Britain January 22, 1945

9 Claims. (Cl. 88—16.8)

This invention relates to film projection of the type in which the film is made to move continuously.

It is one object of this invention to provide a relatively simple method for carrying out such projection in which a good definition is maintained.

It is another object of the invention to provide a relatively simple method for carrying out such projection in which flicker is avoided.

It is a further object of the invention to provide a relatively simple method for carrying out such projection in which a good definition is maintained and at the same time flicker is avoided.

Yet further objects of the invention consists in the provision of relatively simple apparatus by which the methods hereinbefore defined can be carried out severally or simultaneously.

In projecting a continuously moving film, it is necessary to make the moving picture frames appear stationary on the image screen, and hitherto a relatively complicated optical system has been provided for this purpose. The film has been illuminated continuously, or substantially so, and the optical means have served to counteract the motion of the film and have therefore required to be of high quality to ensure exact compensation for the film movement.

In accordance with one aspect of the present invention, in the projection of motion pictures from a continuously moving film the film is illuminated by a small plurality of short periods every frame period. The length of the said short periods is determined by the degree of definition required and the number of picture frames projected per second. The number of such periods per frame is made, in accordance with another aspect of this invention, such that flicker is avoided.

Thus, using an analogy borowed from television to define definition, if the required definition is given by 1000 lines per picture frame, and if the rate of motion of the film is such that 24 frames are projected per second, the duration of each period of illumination should be $1/24000$ second.

With this rate of frame projection, however, the number of flashes of illumination per second, namely 24, will not be high enough to avoid flicker, and it is therefore arranged that there is a small plurality of flashes per frame, for example two, giving a flash rate of 48 per second which is sufficient to avoid flicker.

If the frame speed is less than 24 per second, or if a greater number of flashes per second than 48 is desirable for any reason, the number of flashes per frame may be made greater than 2.

Where the number of flashes per frame exceeds unity, according to a feature of the invention the light beam forming the image of the film picture frame on the image screen is displaced to compensate for the motion of the film that takes place between successive illumination per frame. Since the number of flashes per frame is only two, or at least a small plurality, the optical means needed to effect such compensation are far simpler than those required when the film is continuously illuminated.

The flashes of illumination may be produced by means of a shutter, such for example as a rotating disc having radial slots, in co-operation with a strong continuous light source. In the case of 24 frames per second with two flashes per frame and with the definition above mentioned, for example, the disc may have two diametrically opposed slots, the width of each slot being $1/1000$ of the mean circumference of the disc at the slots. The disc may be rotated by the motor which drives the film at 24 revolutions per second. The disc will then produce two flashes of illumination per frame, each lasting $1/24000$ second. The same effect can be produced with a disc having a single slot of twice the width in the previous example, rotated at twice the speed.

In the arrangement at present preferred, an intermittent light source is used in combination with a disc as described hereinabove, care being taken that the light flashes are at their maximum intensity at the instants when the film is illuminated through any one of the slots. This will generally increase the power of the light source as it is known that the momentary intensity of a flash light source can be made to be much higher than the intensity of a continuous source. If sufficiently brief light flashes in the required rhythm and of the required duration are produced, it is possible to dispense with the shutter altogether.

An example of how the invention may be carried into effect will now be described in more detail in connection with the annexed drawings, but it should be clearly understood that this example is not intended to be in any way restricted to the scope of the invention as it will appear from the appended claims.

In the drawings

Like reference in the three figures refer to like elements.

Figure 1:
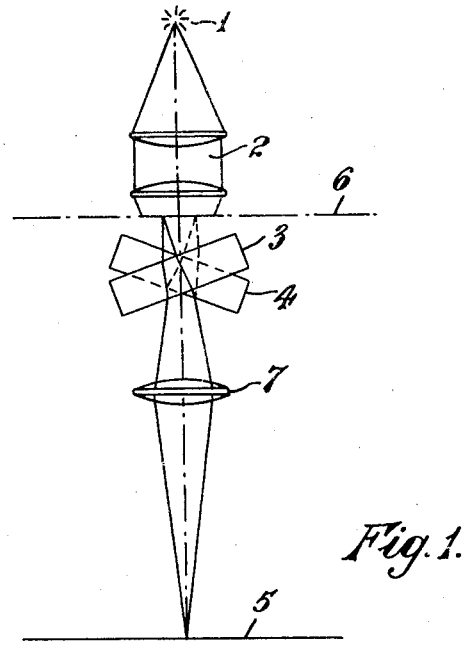
Fig. 1 is an explanatory diagram in the form of a simplified plan view.

Referring now to Fig. 1, light from a source 1, which is assumed to be one giving short flashes and not requiring a shutter is passed through a condensing lens system 2 on to a film 6 which is moved continuously. The light then passes through a displacing member comprising two plano-parallel transparent blocks 3 and 4, arranged one above the other which can be moved alternately into the light path. The light then passes through a projected lens 7 on to an image screen 5.

Figure 2:
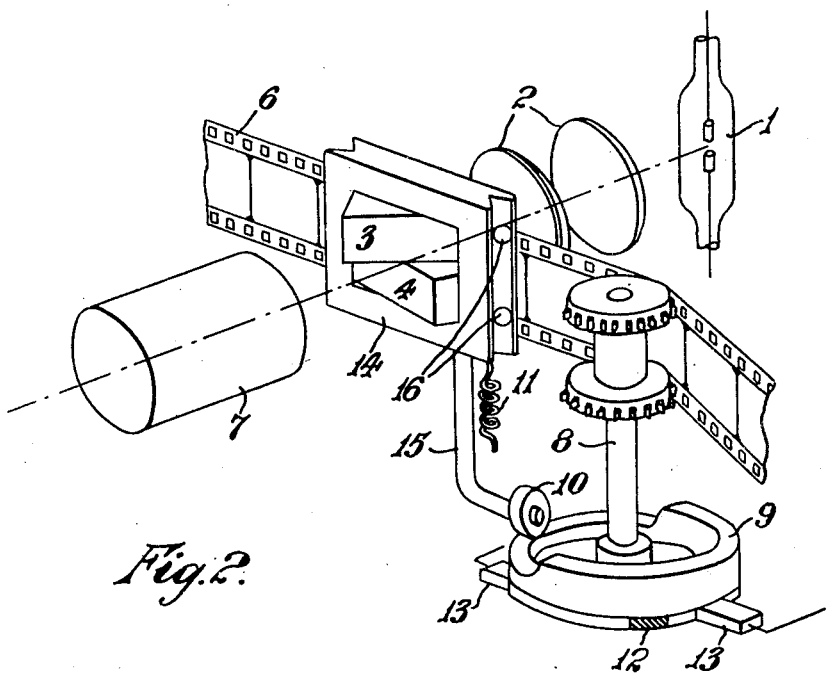
Fig. 2 shows, in perspective, the principal elements of a motion picture projector according to this invention.

Referring to Fig. 2, a film driving shaft 8 carries a cam 9 on which bears a roller 10 kept in engagement with the cam surface by a spring 11. The cam 9 carries a switch member comprising two contacts 12 (one not shown is disposed diametrically opposite to that shown) which co-operate with a pair of brushes 13 which are arranged in the circuit of the lamp 1.

The blocks 3 and 4 are mounted in a carrier 14 which is slidable up and down in suitable bearings not shown but indicated by balls 16 and is connected by an arm 15 to the roller 10.

As the cam 9 rotates the carrier 14 remains in its lower position for one half rotation, and one flash is given by the lamp when the contacts 12 come opposite to the brushes 13. In the next half revolution of the cam 9 the carrier is moved into its upper position, and a second flash is given by the lamp 1 as the contacts 12 again come under the brushes 13. The angular relation of the blocks 3 and 4 corresponds to one half frame pitch, so that although the film has moved forward one half pitch between two successive flashes, the light from the frame is caused to traverse the same path on emerging from the displacing member 3 or 4.

Other suitable displacing devices such as prisms may be used in place of the plano-parallel blocks described.

It is only necessary that two positions of the displacing member 3, 4 should be accurately determined, and the times at which these positions are reached are not material. The mechanism employed for actuating the member can therefore be of a simple kind. This remains true even if a large plurality of flashes per frame, for instance three, are employed. The number used will always be very small compared with that employed in known projectors using a continuously moving film.

Figure 3:
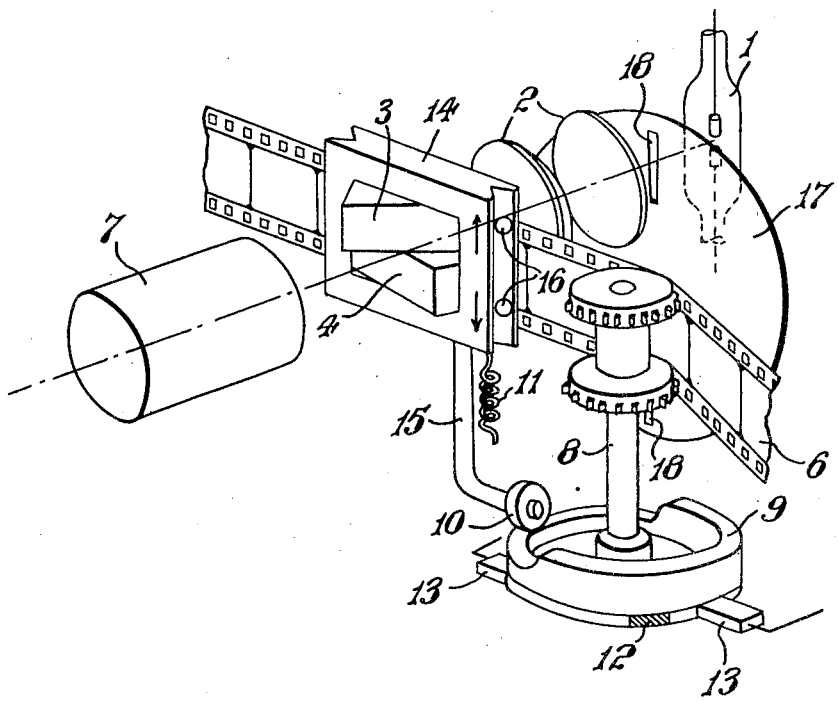
Fig. 3 is similar to Fig. 2 but shows, in addition, a shutter of the kind which may be used according to the invention.

Referring last to Fig. 3, this substantially corresponds to Fig. 2 except that lamp 1 is here supposed to give flashes of too long a duration to ensure the desired definition per se. It is therefore combined with a shutter shown as a disc 17 rotated by means not shown (as they are well known in the art) in such a manner that at the instants when lamp 1 is at its maximum intensity, its light is uncovered towards the film by one or the other of the two slots 18. The width of these two slots is adapted to the speed of rotation of the disc 17 in accordance with the desired definition in the manner outlined hereinabove.

I claim:

1. Apparatus for projecting spatially stationary pictures from continuously moving film comprising means for strongly illuminating each picture frame of said film in succession by a small plurality of flashes of duration only a very small fraction of one frame period, said flashes being so brief that no compensation for the movement of the film which occurs during such flashes is required, means for projecting the picture frames on to a screen by the light by which they are so illuminated, and means for compensating for the movement of the film in the time interval between any two successive flashes during one frame period, said compensating means comprising a small plurality of light displacing elements disposed relative to each other to define discrete, fixed, mutually displaced light paths, and means for moving said members successively into and out of the path of the projecting light, each member moving into the path of the projecting light before one of said flashes, and out of said path after said flash.

2. Apparatus according to claim 1, wherein said motion is rectilinear.

3. Apparatus according to claim 1, wherein said motion is rectilinear and transverse with respect to the path of the projecting light.

4. Apparatus according to claim 1, wherein said light displacing elements comprise transparent plano-parallel blocks.

5. Apparatus for projecting spatially stationary pictures from continuously moving film comprising means for strongly illuminating each picture frame of said film in succession by a small plurality of flashes of duration only a very small fraction of one frame period, said flashes being so brief that no compensation for the movement of the film which occurs during such flashes is required, means for projecting the picture frames on to a screen by the light by which they are so illuminated, and means for compensating for the movement of the film in the time interval between any two successive flashes during one frame period, said compensating means comprising a light displacing element disposed to effect a discrete, substantially fixed displacement of light incident thereon, and means for moving said element into the path of the projecting light before one of said flashes and for removing it from said path after such flash.

6. Apparatus according to claim 5, wherein said movement is rectilinear and transverse with respect to the path of the projecting light.

7. Apparatus for projecting spatially stationary pictures from continuously moving film comprising means for strongly illuminating each picture frame of said film in succession by a small plurality of flashes of duration only a very small fraction of one frame period, said flashes being so brief that no compensation for the movement of the film which occurs during such flashes is required, means for projecting the picture frames on to a screen by the light by which they are so illuminated, and means for compensating for the movement of the film in the time interval between any two successive flashes during one frame period, said compensating means comprising a light displacing element having at least one light refracting surface, and means for moving said element into and out of the path of the projecting light once during each frame period, while maintaining the plane of said refracting surface parallel to itself.

8. Apparatus according to claim 7, wherein said movement is rectilinear and transverse with respect to the path of the projecting light.

9. Apparatus for projecting spatially stationary pictures from continuously moving picture film comprising a strong intermittent light source, a movable shutter adapted to shut off the light from said source from the screen except during a small plurality of very brief intervals during each frame period, said intervals being so brief that no compensation for the movement of the film which occurs during such intervals is required, means to synchronize said intermittent light source and said movable shutter in such a manner that said shutter opens a path for the light from said source to the screen when the light from said source is at least near its maximum intensity, means for projecting the picture frames on to a screen by the light by which they are so illuminated, and means for compensating for the movement of the film in the time interval between any two successive flashes during one frame period, said compensating means comprising a light displacing element disposed to effect a discrete, substantially fixed displacement of light incident thereon, and means for moving said element into the path of the projecting light before one of said flashes and for removing it from said path after such flash.

GUSTAV WIKKENHAUSER.

REFERENCES CITED

The following references are of record in the file of this patent:

UNITED STATES PATENTS

| Number | Name | Date |
|---|---|---|
| 1,929,173 | Koch | Oct. 3, 1933 |
| 2,113,194 | Dorgello | Apr. 5, 1938 |
| 2,173,768 | Sabol et al. | Sept. 19, 1939 |
| 2,186,013 | Edgerton | Jan. 9, 1940 |
| 2,257,938 | Clothier | Oct. 7, 1941 |

FOREIGN PATENTS

| Number | Country | Date |
|---|---|---|
| 364,302 | Great Britain | Jan. 7, 1932 |
| 472,013 | Great Britain | Sept. 15, 1937 |